United States Patent [19]
Baker

[11] 3,799,569
[45] Mar. 26, 1974

[54] TILT AND TELESCOPING STEERING SYSTEM

[75] Inventor: Charles G. Baker, Racine, Wis.

[73] Assignee: J. I. Case Company, Racine, Wis.

[22] Filed: June 21, 1972

[21] Appl. No.: 264,896

[52] U.S. Cl................. 280/87 A, 74/493, 403/109, 403/322
[51] Int. Cl.............................................. B62d 1/18
[58] Field of Search........... 180/78; 280/87 R, 87 A, 280/87 B; 74/492, 493; 287/103, 58 CT

[56] References Cited
UNITED STATES PATENTS

| | | | |
|---|---|---|---|
| 1,703,485 | 2/1929 | Hughes | 74/493 |
| 3,262,332 | 7/1966 | Wight | 74/493 |
| 2,910,887 | 12/1959 | Helms | 74/493 |
| 3,718,053 | 2/1973 | Cinadr | 74/493 |
| 2,229,394 | 1/1941 | Stinne | 280/87 B |
| 3,700,257 | 10/1972 | Hurlburt | 74/493 |
| 2,769,351 | 11/1956 | Serfling et al. | 74/493 |
| 3,316,774 | 5/1967 | Vogelgesang | 74/493 |
| 2,792,719 | 5/1957 | Lanzone | 74/493 |

*Primary Examiner*—Kenneth H. Betts
*Attorney, Agent, or Firm*—Dressler, Goldsmith, Clement & Gordon, Ltd.

[57] ABSTRACT

This disclosure relates to a steering system for a vehicle in which a steering column can be telescoped relative to the vehicle as well as tilted with respect to a fixed axis. The steering system includes a steering column consisting of inner and outer telescoping members that have locking means consisting of first and second keyways defined on adjacent surfaces of the respective members with the keyways defining openings that receive elongated keys. An elastomeric element is located at one end of each of the openings and retained therein by a retaining ring. The locking means also includes drive means for moving the key axially within the openings defined by keyways to deform the elastomeric elements and frictionally grip the members to hold them in telescopically adjusted position.

16 Claims, 6 Drawing Figures

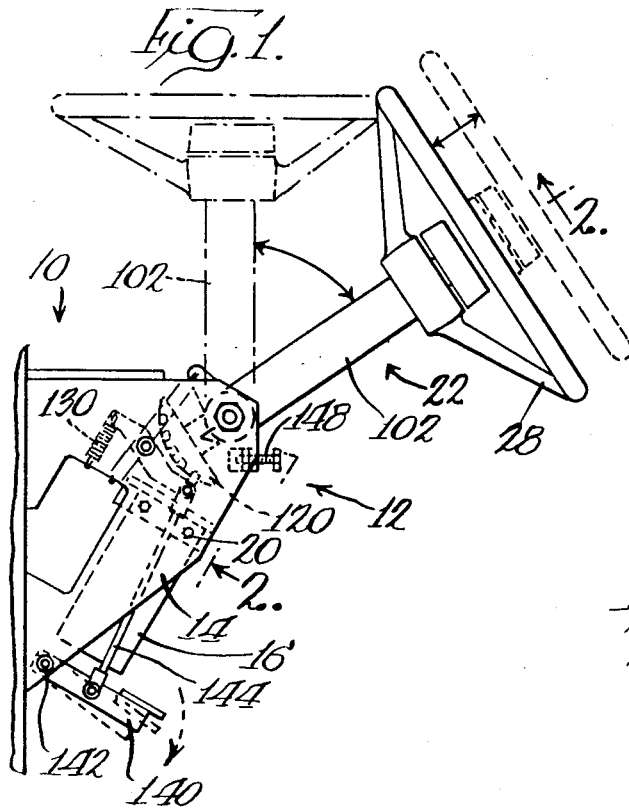
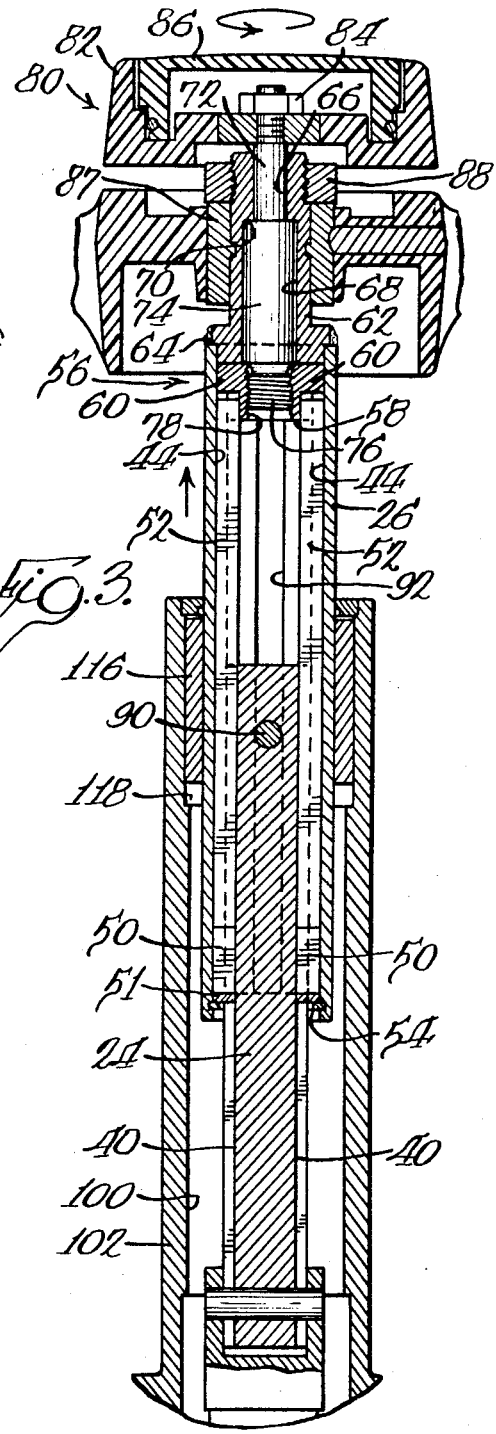
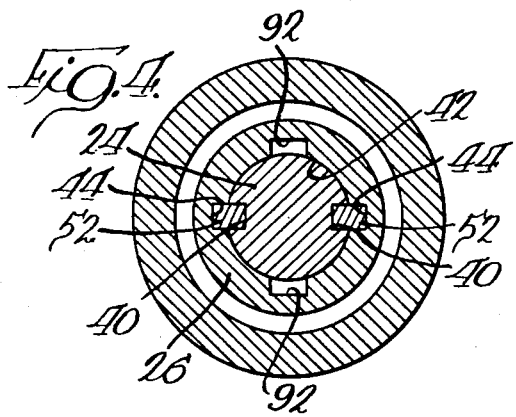
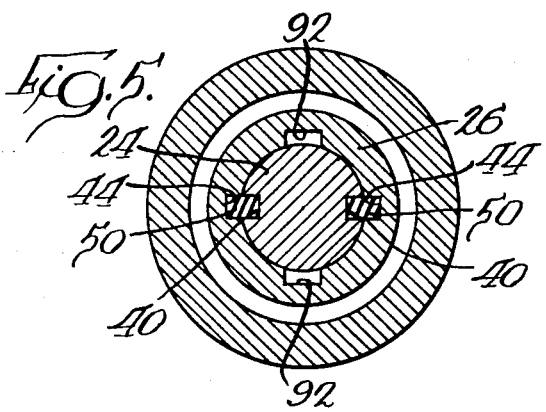

TILT AND TELESCOPING STEERING SYSTEM

BACKGROUND OF THE INVENTION

The present invention relates generally to adjustable controls and more particularly to an adjustable steering system for an agricultural or industrial vehicle.

In recent years, considerable emphasis has been placed upon operator comfort for agricultural and industrial vehicles. For example, during the operation of such vehicles, the operator often chooses to stand rather than sit on the seat so that he can have better visibility for the area surrounding the vehicle or to relieve the fatigue of remaining in one position for extended periods of time. With a fixed steering column, the change of position may make it uncomfortable or hazardous to properly control the vehicle.

Another problem encountered in farm and industrial vehicles, particularly in the larger sizes, is the variations in size of the operators. For example, most larger vehicles provide an adjustable driver's seat so that the most comfortable position relative to the break and other control pedals can be attained by the driver, as determined by the length of the driver's legs. If the steering column and wheel cannot also be adjusted accordingly, the position of the steering wheel, more often than not, will be incorrect. If the short driver is to adjust the seat to a forward position so that the control pedals are readily accessible, the steering wheel would probably be too close to the driver's body and may even touch it. On the other hand, a tall driver who has moved the seat rearwardly may find it difficult to reach the steering wheel because it is too far away for comfort.

In order to alleviate these problems, vehicle manufacturers have made available axially and angularly adjustable steering columns which can be positioned relative to the driver's seat so that a driver, regardless of size or height, can adjust the steering wheel to a comfortable position. Also, the steering system can be adjusted to be readily accessible to the operator, whether he is standing or seated.

While numerous types of adjustable steering systems have previously been proposed, there is a continuous effort being made on the part of manufacturers to provide a better unit that is less expensive. It is well known that the competitive nature of present day equipment manufacturers dictates that even small savings in cost of manufacture is highly desirable particularly when such savings also result in a better unit.

SUMMARY OF THE INVENTION

The present invention consists of an adjustable steering system that includes a steering wheel which is capable of being adjusted axially of a control console of a vehicle as well as being tilted relative to a horizontal axis on the control console. The steering system includes a minimum number of relatively inexpensive parts that can readily be manufactured and the system allows for adjustment of the steering wheel to an infinite number of axially adjusted positions.

The steering system consists of first and second or inner and outer telescoping members that define a steering column with a steering wheel secured to one end of one of the members. The telescoping members are held in telescopically adjusted positions by locking means forming part of the present invention. The locking means includes first and second keyways on the respective members which cooperate with each other to produce diametrically opposed elongated openings with an elastomeric element located adjacent one end of each of the openings. Abutment means defined adjacent one end of the openings retain the elastomeric elements within the openings. An elongated key is slidably received in each opening and drive means cooperate with one end of the keys and the adjacent end of a telescoping member to axially move the keys within the openings. The axial movement of the keys will compress the elastomeric elements to produce frictional engagement between adjacent surfaces of the elements and the corresponding surfaces of the telescoping member to thereby frictionally hold the members in adjusted positions.

In the specific embodiment, the outer telescoping member has a bore extending therethrough with the telescoping member being a shaft received in the bore. The drive means consists of a special nut that has portions extending into the keyways that are defined in the wall of the bore of the outer member with a plug secured to the adjacent end of the outer member. The plug has an opening which has an enlarged portion adjacent the nut to define a shoulder and a rotatable element extends through the opening and has an enlarged portion which engages the shoulder. A threaded segment on the lower end of the rotatable element is received into a threaded opening in the nut so that rotation of the rotatable element will produce axial movement of the nut within the bore of the telescoping member.

According to a further aspect of the invention, the entire column is resiliently supported within an opening in a support and the support is pivoted about a fixed horizontal axis on the vehicle so that the position of the steering wheel can be tilted to any desired angle with respect to the vehicle. The support is biased to a first extreme position and latch means are provide between the vehicle and support for maintaining the support in a plurality of adjusted positions with respect to the vehicle.

The latch means includes a partial quadrant that is laterally offset from the axis of the opening in the support and has a plurality of spaced notches on the peripheral surface. A lever is pivoted intermediate its ends on the vehicle and has a latch pin at one end for engaging any one of the notches with biasing means cooperating with the opposite end of the lever for normally biasing the latch pin towards the quadrant. The lever is pivoted to a disengaged position through a foot pedal that is also pivoted on the vehicle at a location below the pivot for the lever with a connecting rod interconnecting the pedal and the pin end of the lever. The latch means therefore can be located in a remote position from the steering wheel without any element protruding from the steering wheel and column that could be hazardous for the operator during the manipulation of the vehicle.

BRIEF DESCRIPTION OF SEVERAL VIEWS OF DRAWINGS

FIG. 1 is a fragmentary side elevation of the control console of a vehicle having the steering system of the present invention incorporated therein;

FIG. 3 is a fragmentary sectional view similar to FIG. 2 showing the steering system in position for telescopic movement of the telescoping members;

FIG. 4 is a transverse section taken generally along line 4—4 of FIG. 2;

FIG. 5 is a transverse section taken generally along line 5—5 of FIG. 2; and

DETAILED DESCRIPTION

Figure 2:
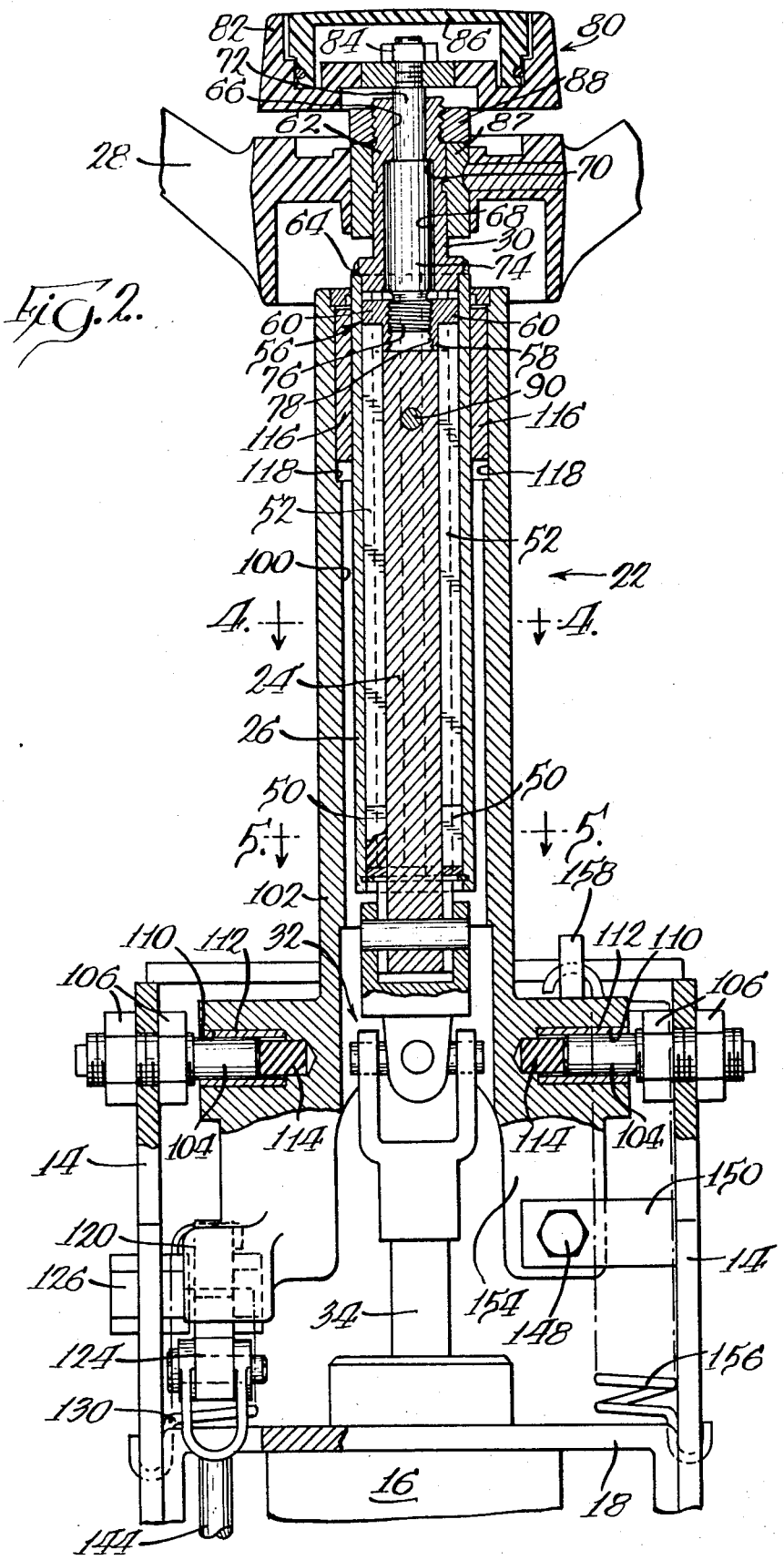
FIG. 2 (appearing on a separate sheet) is an enlarged sectional view of the steering column and its support, as viewed along line 2—2 of FIG. 1.

While this invention is susceptible of embodiment in many different forms, there is shown in the drawings and will herein be described in detail one specific embodiment, with the understanding that the present disclosure is to be considered as an exemplification of the principles of the invention and is not intended to limit the invention to the embodiment illustrated.

Referring to FIG. 1 of the drawings, there is shown a fragmentary portion of control console 10 that forms part of a vehicle, such as an agricultural tractor (not shown). Steering system 12, constructed in accordance with the present invention, is carried on a pair of transversely spaced brackets 14 (FIG. 2) that form part of control console 10. Steering system 12 includes control pump 16 that is fixedly secured to brackets 14 through U-shaped bracket 18 (FIG. 2) extending between brackets 14 and secured thereto through bolts 20 (FIG. 1).

Steering system 12 (FIG. 2) further includes steering column 22 that is of the telescopically adjustable type and includes inner and outer members 24 and 26. Outer telescoping member 26 has steering wheel 28 fixedly secured to the upper free end thereof through connection means 30 that will be described later. Inner telescoping member 24 has its lower free end connected through connection means 32, in the form of a universal joint, to control element 34 that forms part of control pump 16.

As was indicated above, numerous types of locking means for holding the inner and outer telescoping members of the steering column in adjusted positions have previously been proposed. However, most of these devices require accurate alignment of cooperating elements on the two members before the members can be locked in its adjusted position. For example, many devices include some type of locking element that is carried by one of the members and cooperates with axially spaced openings on the other of the members. This means that the locking element must be accurately aligned with any one of the openings before the telescoping members can be locked in an adjusted position. Such an arrangement limits the number of adjusted positions that are available for the unit.

According to the present invention, the locking means that interlocks the two telescoping members forming the steering column can hold the two members in an infinite number of telescopically adjusted positions. The locking means is constructed of a minimum number of parts that are inexpensive to manufacture.

The locking means for maintaining the telescoping members in telescopically adjusted positions is most clearly shown in FIGS. 3 through 5 and consists of first and second elongated keyways 40 located at diametrically opposed locations on the circular inner member or first telescoping member 24. Outer or second telescoping member 26 is tubular in form and has elongated bore 42 that slidably supports circular member or shaft 24 for sliding movement therewith. Outer or second tubular member 26 likewise has first and second elongated keyways 44 that respectively cooperate with keyways 40 to define first and second diametrically located elongated openings. These openings intersect the adjacent surfaces of the first and second telescoping members 24 and 26, as is most clearly shown in FIGS. 4 and 5.

The locking means also include first and second elastomeric elements 50 that are located in the openings adjacent one end thereof. Outer or second circular member 26 has washer 51 retained in the lower end of bore 42 through snap ring 54 and the washer defines an abutment that closes at least a portion of the lower ends of the openings defined by keyways 40,44 to retain elastomeric elements 50 within the respective openings.

The locking means further includes first and second keys 52 also slidably supported within the openings with the lower ends of keys 52 engaging the upper ends of elastomeric elements 50. Drive means 56 cooperate with the upper end of the keys to move the keys within the openings, as will be described later.

Drive means 56 is most clearly shown in FIGS. 2 and 3 and consists of nut 58 that has first and second portions 60 extending into keyways 44 on outer telescoping member 26 adjacent its free end and means carried by the free end of the outer telescoping member for shifting nut 58 relative to the outer telescoping member. The means for shifting the nut includes plug 62 that forms the connection means 30 between the outer telescoping member 26 and steering wheel 28. Plug 62 is fixedly secured to the upper free end of telescoping member 26, as by weld 64, and has opening 66 extending therethrough, which opening has an enlarged portion 68. Enlarged portion 68 of opening 66 defines a shoulder 70 intermediate opposite ends of opening 66. Rotatable element 72 is supported within opening 68 and also has corresponding enlarged portion 74 that has one end in engagement with shoulder 70 to prevent axial movement of the rotatable element out of opening 66. The lower end of rotatable element 74 has threaded portion 76 that is received into internally threaded opening 78 or nut 58.

The upper end of rotatable element 72 extends beyond the upper end of plug 62 and has turning member or hand wheel 80 secured thereto. Hand wheel 80 may be in the form of hub 82 connected to rotatable element 74 through nut 84 and a suitable decorative cap 86 may be received into the open end of hub 82 to cover nut 84.

Steering wheel 28 may be secured to plug 62 by keys 87 received in keyways on the plug and the hub of wheel 28. The assembly may be held in position by nut 88.

The threads in threaded opening 78 and on threaded portion 76 are of a special left-hand type so that rotation of hub or hand wheel 80 in a clockwise direction, as viewed from the end of steering wheel 28, will axially shift nut 58 downwardly along bore 42 within outer member 26. This axial shifting of nut 58 will cause keys 52 to move axially along the respective keyways in outer and inner telescoping members 24,26 to thereby compress elastomeric elements or resilient blocks 50 and expand the blocks within the openings defined by keyways 40, 44. As a result, the resilient blocks will frictionally engage the adjacent surfaces of keyways 40 and 44 to hold the inner and outer telescoping members in adjusted position. As can be appreciated from the above description, the locking means allows for first and second telescoping members 24 and 26 to be held in an infinite number of telescopically adjusted positions.

The telescoping members may readily be readjusted to a new position by rotation of hand wheel 80 in a counter-clockwise direction which will cause nut 58 to be moved axially upwardly within bore 42 and allow elastomeric elements 50 to assume their unstressed condition (shown in FIG. 3) releasing the frictional gripping on the adjacent surfaces of the telescoping members. The outer telescoping member may then be raised or lowered relative to the fixed inner member by gripping the steering wheel. The release and locking of the telescoping members can readily be performed while the operator is in seat while the vehicle is moving.

It should also be noted that cooperating keyways 40 and 44 and keys 52 will prevent rotation of the telescoping members relative to each other so that any rotation of steering wheel 28 will be transmitted directly to control pump 16.

In order to insure that the telescoping members cannot be separated, the inner telescoping member has cross-pin 90 extending through an opening therein with the outer ends of pin 90 received into a second pair of keyways 92 on outer telescoping member 26. The pin ends of pin 90 engage the upper surface of washer 51 when outer telescoping member is in the outermost position to prevent separation of the members.

According to another aspect of the invention, steering system 12 incorporates mechanism that allows steering wheel 28 to be tilted to a plurality of tilted positions with respect to the control console of the vehicle. For this purpose, steering column 22, consisting of inner and outer telescoping members 24 and 26, extends through elongated opening 100 (FIG. 2) in elongated support 102 that is pivoted about a fixed horizontal axis on the vehicle. The fixed horizontal axis on the vehicle is defined by first and second pins 104 respectively carried by brackets 14 and extending inwardly therefrom towards each other. Pins 104 are held in adjusted positions by lock nuts 106 threadedly received on pins 104 and engaging the opposite surfaces of brackets 14. Pins 104 are received into circular recesses 110 that extend from opposite surfaces of support 102. In order to reduce the amount of friction developed between pins 104 and recesses 110, anti-friction sleeves 112 are preferably inserted into recesses 110 and engage pins 104.

According to another aspect of the invention, support 102 is maintained in a centered position between brackets 14 while steering column 22 is maintained centered with respect to opening 100 within support 102. For this purpose, resilient blocks 114 are positioned in recesses 110 and engage the inner ends of pins 104. The resilient blocks or elements will automatically maintain support 102 in a centered position with respect to brackets 14. Additional resilient blocks 116 are received in slots 118 defined in the surface of opening 100 and engage the peripheral surface of outer tubular member 26. Thus, resilient blocks 114 and 116 will maintain the steering column in a centered position with respect to the brackets 14 as well as support 102. The resilient blocks also substantially isolate the steering column and steering wheel from the vehicle to reduce the vibrations that might develop during the operation of the vehicle.

The steering column and steering wheel are held in any one of the plurality of pivoted or tilted positions with respect to the vehicle by suitable latch means which will now be described. The latch means consists of partial quadrant 120 (FIGS. 1 and 6) that is laterally offset to one side of the axis of opening 100 in support 102. Quadrant 120 has a plurality of circumferentially spaced notches 122 that define respectively adjusted positions for the steering column and steering wheel. The latch means further includes latch lever 124 that is pivoted intermediate its ends on bolt 126, carried by one of brackets 14. Latch pin 128 is formed integral with one end of lever 124 and spring 130 cooperates with the opposite end of lever 124 and is attached to one of brackets 14. Spring or biasing means 130 urges latch pin 128 towards quadrant 120 so that latch pin 128 will automatically move into notch 122 on quadrant 120 when the associated notch is in alignment with latch pin 128.

The latch means further includes means for releasing latch pin 128 from an engaged notch. The release means consists of foot pedal 140 that is pivoted at 142 on one of the brackets 14 with a control rod 144 interconnecting foot pedal 140 and the latch pin end of lever 124.

The foot pedal control release means allows the entire latch means to be located at a remote position with respect to the steering wheel for the vehicle. Heretofore, it has been customary to provide the release mechanism for the tilting aspect of the steering system in close proximity to the steering, usually at the upper end of the steering column so that the mechanism may inadvertently be actuated during the operation of the vehicle. The foot pedal control release means incorporated into the latch means of the present invention allow all of the hardware and associated parts of the latch means to be located in close proximity to the floor and control console wall for the vehicle.

Figure 6:
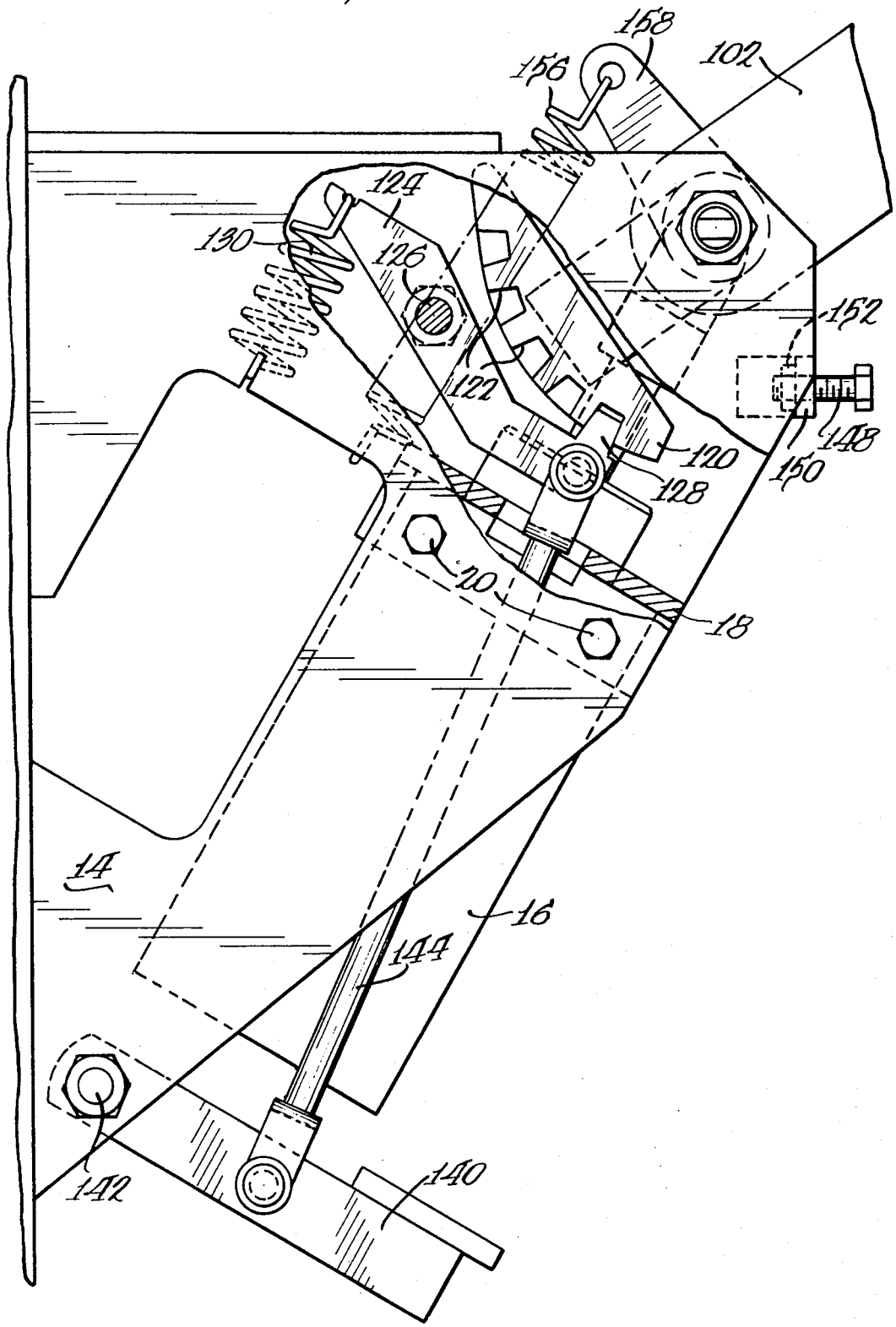
FIG. 6 is an enlarged side elevation of the latch means for holding the steering system in adjusted position.

According to the further aspect of the invention, the steering system also incorporates means for automatically biasing the steering column and steering wheel to one extreme adjusted position when the latch means is released. As shown in FIG. 6, the maximum extreme position is defined by an adjustable stop in the form of stud 148 threaded into one leg of angle bracket 150 that is secured to one of the brackets 14. Lock nut 152 normally holds adjustable stud 148 in an adjusted position in which the inner end thereof is located in the path of movement of laterally offset segment 154 (FIG. 2) extending from the support. Spring 156 has one end connected to bracket 14 and the opposite end connected to arm 158 extending from support 102. With this arrangement, release of latch pin 128 from an associated notch 122 without applying any external forces to the steering system, will cause support 102 to pivot counter-clockwise as viewed in FIG. 6, about the horizontal pivot axis, defined by pins 104, until offset segment or leg 154 is in engagement with the free end of stop 148. By way of example and not of limitation, the miximum extreme position to which the steering column and steering wheel are pivoted by biasing means 156 could be approximately 90° with respect to a horizontal reference plane while the lowermost pivoted position could be approximately 35° with respect to the reference to the plane. Each increment of pivoted position could then be somewhat slightly less than 15° per position between the two extreme positions. The lowermost tilted position could also be defined by a stop engaging an element moving with support 102.

While the invention is believed to be readily understood from the above description, a brief summary will now be set forth. Normally, the locking means between the telescoping members is in the position shown in FIG. 2 wherein nut 58 is spaced somewhat from the plug 62 and elastomeric elements 50 are compressed to produce the frictional gripping between the inner and outer telescoping members. If it is desired to change the axial position of steering wheel 28 with respect to the fixed pivot axis defined by pins 104, it is only necessary to rotate the hand wheel sufficiently to allow the elastomeric elements to assume their substantially unstressed condition shown in FIG. 3, wherein outer telescoping member 26 can be slid relative to the substantially fixed inner telescoping member 24. When the desired position of steering wheel 28 is reached, the hand wheel can then be rotated to compress elastomeric elements 50 and produce the frictional gripping between inner and outer telescoping members 24 and 26.

If it is desired to change the angle of tilt from anywhere between the dotted line and solid line positions shown in FIG. 1, it is only necessary to depress foot pedal or lever 140 to the dotted line position shown in FIG. 1 at which time the operator may pivot steering wheel 28 and steering column 22 about the horizontal fixed pivot axis defined by pins 104. When the desired angle of tilt has been reached, the foot pedal may be released and latch pin 128 will move into an appropriate notch 122.

As can be seen the entire steering system is extremely simple in construction and can readily be operated with a minimum of effort.

I claim:

1. In a vehicle having a steering system including a control pump fixed to the vehicle; a steering column having first and second telescoping members; connection means connecting a free end of one of said telescoping members to said pump; a steering wheel connected to a free end of the other of said telescoping members; and locking means for maintaining said members in telescopically adjusted positions, said locking means including means defining first and second keyways in each of said members, said keyways cooperating to produce first and second elongated openings; first and second elongated keys respectively slidable in said openings; means defining an abutment adjacent one end of said openings with adjacent ends of said keys spaced from said abutment; resilient means in said openings between said keys and abutment; and drive means cooperating with the opposite ends of said keys for moving said keys in said openings and compressing said resilient means thereby producing a frictional grip on adjacent surfaces of said members to hold said members in telescopically adjusted positions.

2. A vehicle as defined in claim 1, further including cooperating means between said telescoping members preventing separation of said telescoping members.

3. A vehicle as defined in claim 1, in which said drive means includes a nut having portions extending into the keyways of said other telescoping member adjacent its free end; and means carried by said free end of said other telescoping member for shifting said nut relative to said other telescoping member.

4. A vehicle as defined in claim 3, in which said means carried by said free end of said other telescoping member includes a plug secured to said telescoping member with an opening extending through said plug, said opening in said plug having an enlarged portion adjacent said nut to define a shoulder; a rotatable element in said opening, said rotatable element having an enlarged portion in said enlarged portion of said opening and engaging said shoulder, said rotatable element having a threaded segment received into a threaded opening in said nut; and a gripping member fixed to the opposite end of said rotatable element.

5. A vehicle as defined in claim 1, further including a support for said steering column; means for pivoting said support about a horizontal pivot on said vehicle to position said steering wheel in a plurality of adjusted positions relative to said vehicle; and latch means between said vehicle and said support for maintaining said support in adjusted positions on said vehicle; and in which said connecting means includes a universal connection accommodating said pivotal movement.

6. A vehicle as defined in claim 5, further including resilient means between said support and said steering column for isolating said steering column from said support.

7. A vehicle as defined in claim 5, further including biasing means between said support and vehicle, said biasing means moving said support and steering column into an extreme pivoted position when said latch means is released and no external force is applied to said support and steering column.

8. A vehicle as defined in claim 5, in which said latch means includes a quadrant having a plurality of spaced notches on said support; a pivoted latch having a latch pin for engaging said notches; and biasing means cooperating with said latch and pivoting said latch pin into engagement with said quadrant.

9. A vehicle as defined in claim 8, in which said latch means further includes a foot pedal pivoted on said vehicle and means connecting said foot pedal to said pivoted latch to allow said foot pedal to be actuated to pivot said latch pin away from said quadrant.

10. A vehicle as defined in claim 6, in which said means for pivoting said support includes a pair of transversely spaced brackets with inwardly directed pins defining said horizontal pivot and in which said support has circular recesses for receiving said pins with said support located between said bracket, further including resilient plugs in said recesses and engaging the inner ends of said pins for maintaining support centered between said brackets.

11. An adjustable steering system comprising inner and outer telescoping members; means defining elongated keyways respectively on adjacent surfaces of said members, said elongated keyways being in opposed relation and cooperating to define an elongated opening; means defining an abutment on one end of said opening; a key in said opening and slidable therein; an elastomeric element between said abutment and the adjacent end of said key; and drive means cooperating with one of said members and engaging the opposite end of said key to move said key along said opening and compress said elastomeric element to produce frictional engagement of said element with said adjacent surfaces of said members and maintain said members in a telescopically adjusted position.

12. An adjustable steering system as defined in claim 11, in which said telescoping members are circular and said key prevents relative rotation between said members.

13. An adjustable steering system as defined in claim 11, in which said outer member has a bore slidably receiving said inner member and in which said drive means includes a nut in said bore, and said nut having a portion in the keyway of said outer member and means carried by said outer member and cooperating with said nut for axially shifting said nut in said bore.

14. In an adjustable steering system including inner and outer circular telescoping members, and locking means for maintaining said members in telescopingly adjusted positions, said locking means comprising means defining first and second keyways in the adjacent surfaces of said members, said keyways cooperating to define first and second elongated opposed openings at circumferentially spaced locations on said members; an elastomeric element in each of said openings; means for retaining said elastomeric elements in said openings; a key slidably received in each opening and having one end engaging the elastomeric element; and drive means cooperating with said keys for axially moving said keys in said openings and compressing said elements to frictionally grip said members.

15. An adjustable steering system as defined in claim 14, further including a support having a circular opening for receiving said telescoping members; and resilient means between said support and telescoping members maintaining said telescoping members centered in said opening of said support.

16. An adjustable steering system as defined in claim 15, further including a pair of brackets having means defining a horizontal pivot with said support pivoted on said horizontal pivot to accommodate tilting of said telescoping members; and means between said brackets and said support for maintaining said support in a plurality of tilted positions.

* * * * *